(12) United States Patent
Kuniavsky et al.

(10) Patent No.: US 10,175,071 B2
(45) Date of Patent: Jan. 8, 2019

(54) PRINTED ELECTRONIC SENSING FILMS FOR DETECTING LARGE-SCALE PHENOMENA

(71) Applicant: PALO ALTO RESEARCH CENTER INCORPORATED, Palo Alto, CA (US)

(72) Inventors: Michael Kuniavsky, San Francisco, CA (US); Paula M. Te, San Francisco, CA (US)

(73) Assignee: PALO ALTO RESEARCH CENTER INCORPORATED, Palo Alto, CA (US)

( * ) Notice: Subject to any disclaimer, the term of this patent is extended or adjusted under 35 U.S.C. 154(b) by 34 days.

(21) Appl. No.: 15/154,507

(22) Filed: May 13, 2016

(65) Prior Publication Data
US 2017/0330003 A1    Nov. 16, 2017

(51) Int. Cl.
*G01D 11/30*    (2006.01)
*G01D 21/00*    (2006.01)

(52) U.S. Cl.
CPC .................... *G01D 21/00* (2013.01)

(58) Field of Classification Search
CPC ................................. G06K 7/10366
USPC ......................................... 340/10.1
See application file for complete search history.

(56) References Cited

U.S. PATENT DOCUMENTS

| | | | |
|---|---|---|---|
| 2010/0039234 A1* | 2/2010 | Soliven | H04B 5/02 340/10.1 |
| 2012/0065937 A1* | 3/2012 | de Graff | G01D 9/005 702/187 |

* cited by examiner

*Primary Examiner* — Qutbuddin Ghulamali
(74) *Attorney, Agent, or Firm* — Miller Nash Graham and Dunn

(57) ABSTRACT

A system for remote sensing includes a flexible sheet, having printed thereon electronic sensors, logic components arranged in circuits, the circuits electrically connected to the sensors, memory electrically connected to the circuits, energy harvesting components electrically connected to the circuits, and a communications interface. The system includes a remote reader, the reader having at least one energy broadcast component to broadcast energy to the energy harvesting components, and an interface to allow the reader to access data from the sensors. A sensor network includes a flexible sheet, electronic sensors printed on the flexible sheet, logic components arranged in circuits, the circuits electrically connected to the sensors, memory electrically connected to the circuits. energy harvesting components electrically connected to the circuits, and a communications interface.

13 Claims, 4 Drawing Sheets

PRINTED ELECTRONIC SENSING FILMS FOR DETECTING LARGE-SCALE PHENOMENA

FIELD OF THE INVENTION

This disclosure relates to distributed sensing, more particularly distributed sensing using printed electronics and remote sensing.

BACKGROUND

Distributed sensing allows sensing across large areas such as agricultural fields, manufacturing floors, etc. However, the costs to distribute the numbers of sensors needed to cover these areas may prevent their distribution. In addition, the number of sensors in the large area require some affordable and reliable way to gather their data.

Several different applications may benefit from affordable large area sensors with an associated affordable detection of the sensors' data. One such application consists of plasticulture, the practice of using plastic materials in agricultural applications. The uses in plasticulture include soil fumigation film, irrigation drip tape/tubing, nursery pots and silage bags, plastic greenhouses, etc. Other applications include sensing the state of curing in structural materials like resin and concrete.

SUMMARY

One embodiment is a system for remote sensing includes a flexible sheet, having printed thereon electronic sensors, logic components arranged in circuits, the circuits electrically connected to the sensors, memory electrically connected to the circuits, energy harvesting components electrically connected to the circuits, and a communications interface. The system includes a remote reader, the reader having at least one energy broadcast component to broadcast energy to the energy harvesting components, and an interface to allow the reader to access data from the sensors.

Another embodiment is a sensor network includes a flexible sheet, electronic sensors printed on the flexible sheet, logic components arranged in circuits, the circuits electrically connected to the sensors, memory electrically connected to the circuits. energy harvesting components electrically connected to the circuits, and a communications interface.

DETAILED DESCRIPTION OF THE EMBODIMENTS

Printing technologies have progressed to allow for the accurate deposition of a wide variety of materials with electrical properties, such as printable conductive and semi-conductive materials and chemicals that can be used for creating solid state sensors and batteries. The materials can change as needed, mixed with flexible substances such as polymers to form paste that ultimately solidify into flexible structures. Circuitry such as sensors and antennas, as well as resistors, capacitors, connecting lines, etc. can be printed using standard printing techniques with slightly different materials. It is also possible to print more active circuitry, such as sense amplifiers, memory elements, analog to digital converters, logic gates and light emitting diodes. Traditional electronic components such as etched silicon wafers and LEDs may not be printed but may be attached to the sheet with printed adhesives.

Figure 1:
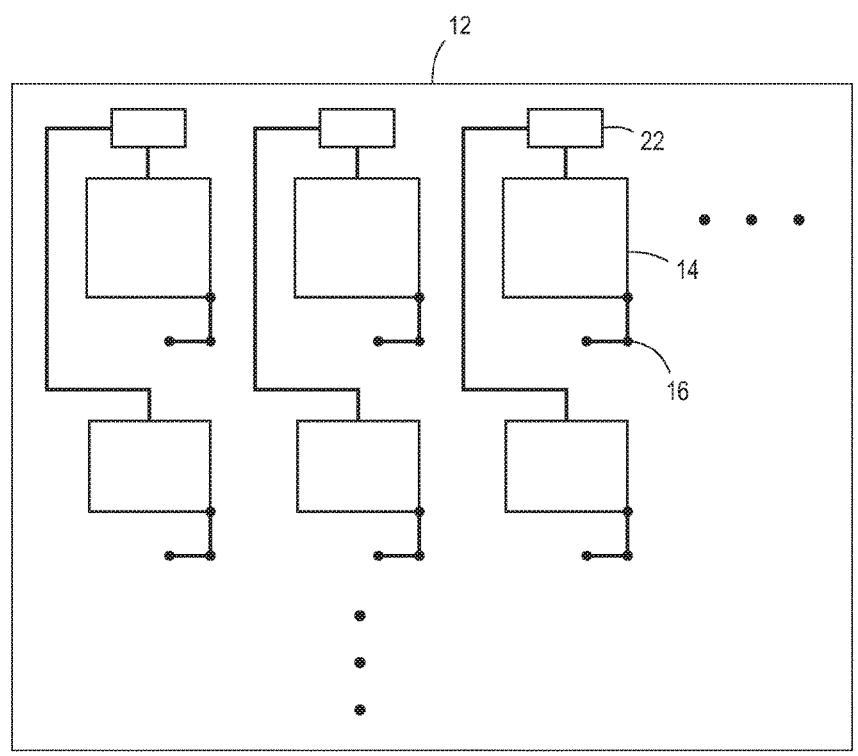
FIG. 1 shows an embodiment of a flexible sheet having a printed sensor network.

FIG. 1 shows an embodiment of a flexible sheet having a printed sensor network. The flexible sheet 12 has printed upon it a network of sensors such as 14. In this embodiment, the sensors are arranged around regions of the sheet that may be arranged to allow light to pass through the film to whatever the surface is being covered by the film. The embodiments here are just examples and are not intended in any way to limit the scope of the claims. The printed sensors may be arranged in several different ways, as well as the antennas 16 and the peripheral circuitry 22.

The sensors may be one of any type of sensor, such as heat sensors, chemical sensors, humidity sensors, and temperature sensors. The peripheral circuits may include sense amplifiers arranged to detect current or voltage from the sensors, amplifiers to amplify the signals from the sensors, memory to store the readings, analog to digital converters, light emitting diodes (LEDs), etc.

The antenna may also be an energy harvesting component. Energy harvesting components may also involve energy storage components. The peripheral circuits may then include some sort of energy storage, like chargeable batteries, capacitors, etc. Similarly, the electronic sensors may generate data for later reading, so the peripheral circuits may include memory storage.

Energy harvesting components generally respond to transmitted energies, such as radio frequency energy, electromagnetic fields or magnetic fields. Typically, this printed sheet of sensors and circuitry would receive energy from the same device performing the reading, referred to here as a remote reader because the reader is not located on the plasticulture film. The reader, shown in FIG. 2 as 18, may be a movable reader, such as a drone, or a fixed reader, as will be discussed in more detail later. As the reader traverses the area having the plasticulture film, it sends out a signal 20 that energizes printed electronic circuitry such as processors, sensors, batteries, etc., and communicates the results back to the reader. The reader will typically have an energy broadcasting component that generates a radio frequency signal, an electromagnetic field or a magnetic field. The reader will also have a communications interface that will allow the reader to access the data from the sensors.

Figure 2:
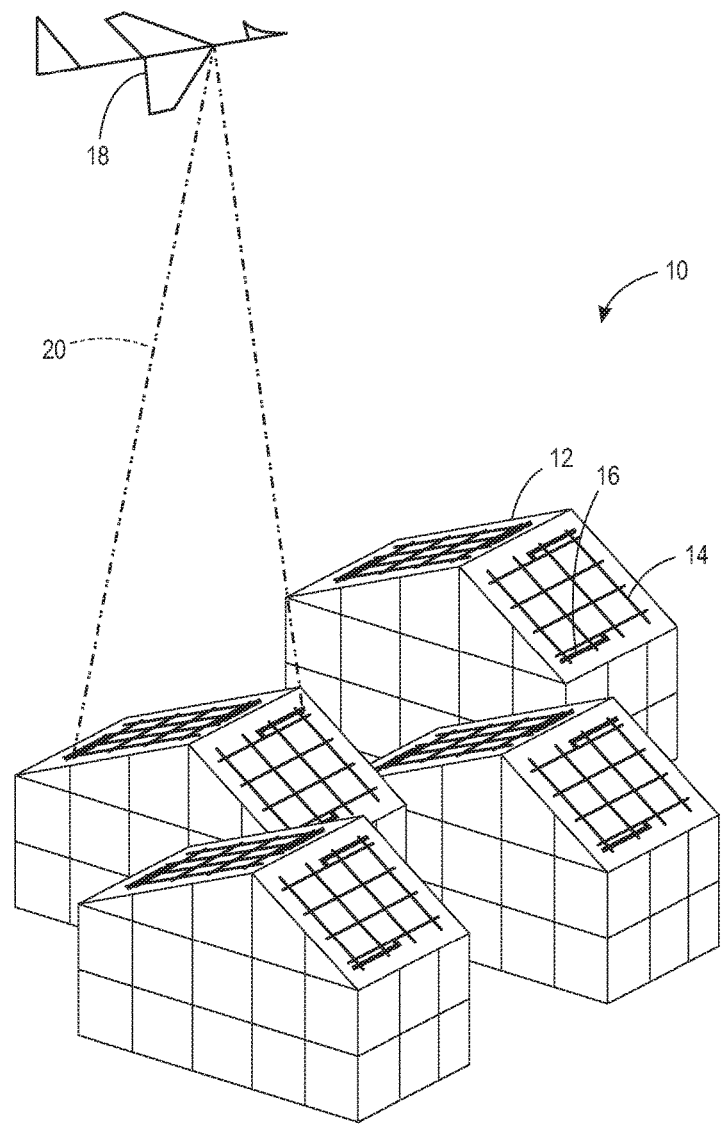
FIG. 2 shows an embodiment of a sensing system having both fixed and mobile remote readers.

The communication interface may involve chemical color change, radio frequency signals, near-field communication signals like Bluetooth, infrared, etc. The communication interface may also involve signals transmitted from the plasticulture film as visible light signals from the LEDs. The reader would then take a picture of the LEDs for later analysis by the user. FIG. 2 shows an embodiment of a series of greenhouses using plasticulture film on the roof. The roofs of the greenhouses are made from plasticulture film 12, on which are the sensors 14 and the antennas 16. The drone or other movable reader 18 then traverses the region in which the greenhouses reside. The reader 18 sends energy out to activate the various sensor components and takes readings in whatever form they take.

Figure 3:
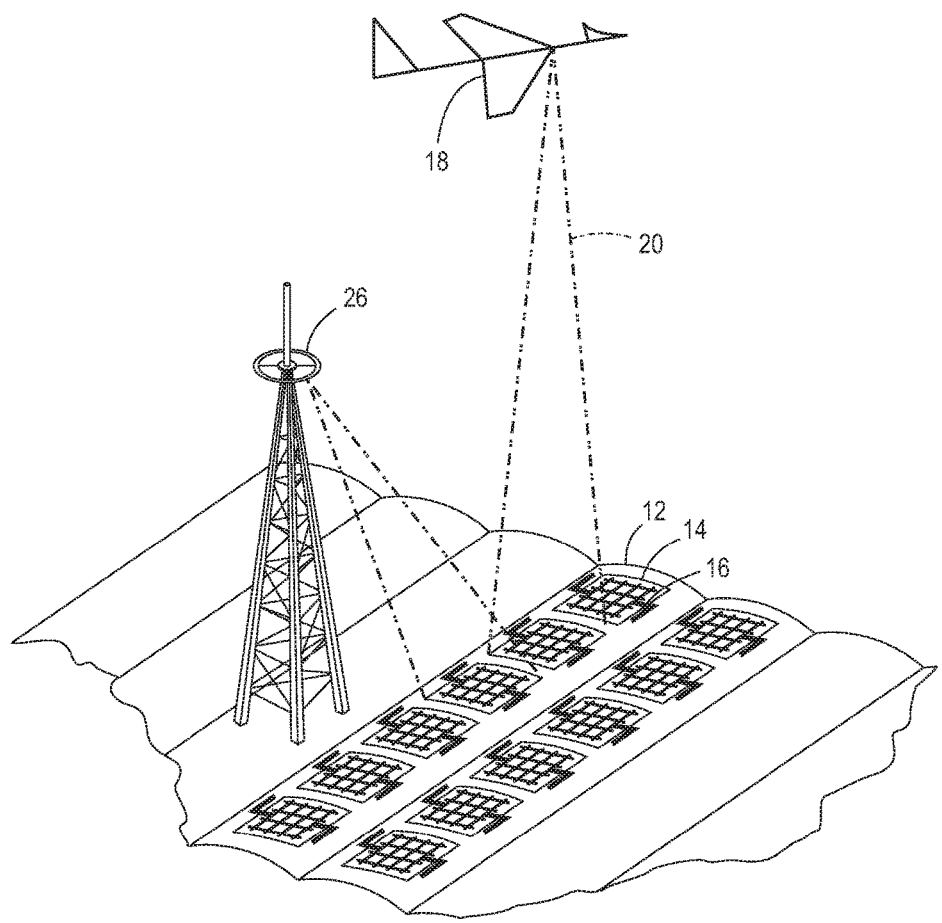
FIG. 3 shows an embodiment of a sensing system used in agricultural environment.

FIG. 3 shows an alternative embodiment of the use of a printed flexible film in agricultural applications. The film 12, with its associated 14 sensors and antennas 16, are laid down over the crops, in such a manner that light still reaches the plants being grown 24. In this embodiment, the reading system includes mobile reader, such as a drone 18, and a fixed reader 26. The fixed reader 26 may be mounted on a tower, or otherwise arranged to provide power to the various sensor and receive their signals.

Returning to FIG. 1, the films may also include microfluidic channels and reservoirs to allow for the selective release of certain materials in response to sensor readings. For example, ripening fruit gives off ethylene. The amount of ethylene indicates the ripeness of the fruit. The film could have mechanisms to release ripening agents, fertilizers, more water, etc.

Figure 4:
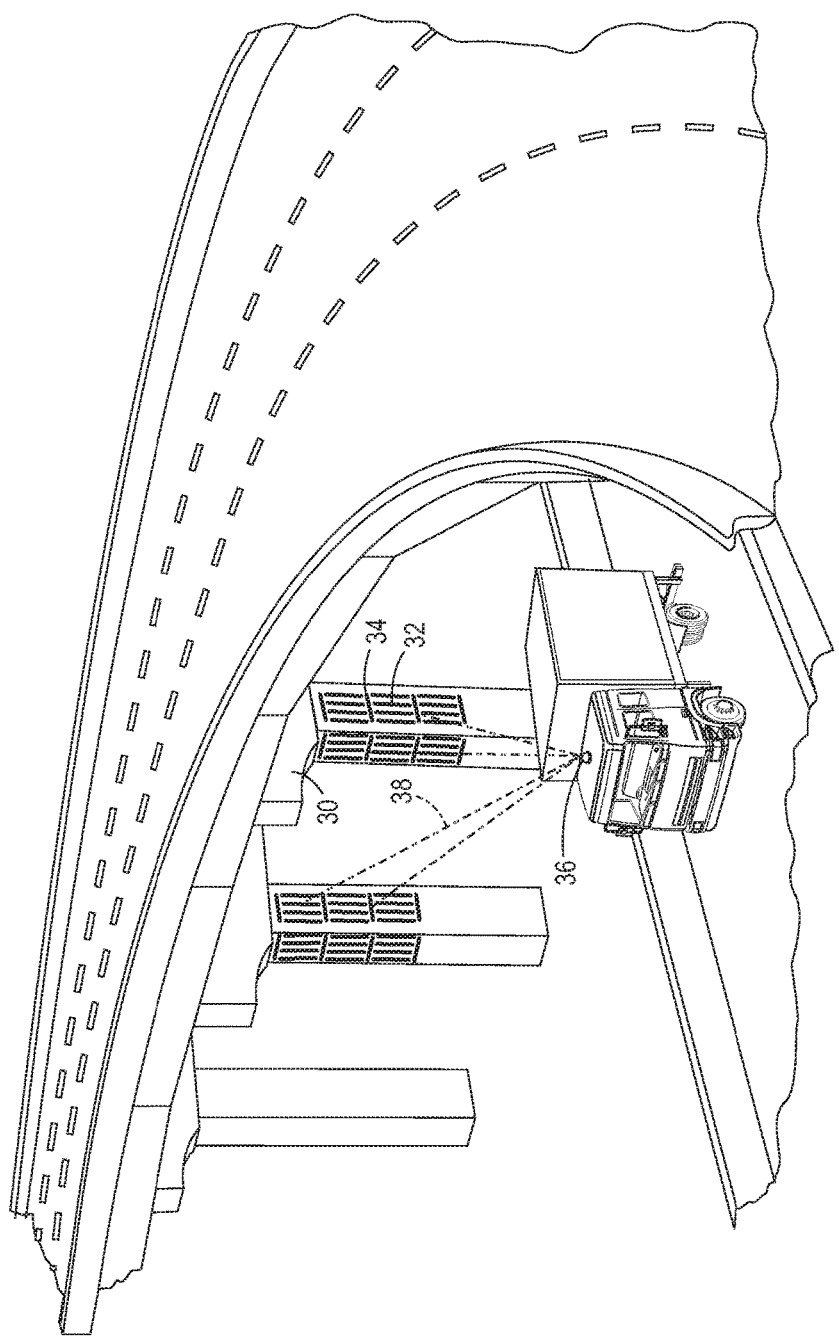
FIG. 4 shows an embodiment of a sensing system used in a construction environment.

The ability to sense the status of materials underlying the film has many applications. For example, as shown in FIG. 4, the sheets could contain sensors that monitor the humidity change generated by materials that are curing or drying, or any trademark chemicals that are exuded by such materials as they cure. In FIG. 4, the structure 30 could consist of concrete, resin, other curable or dryable materials, such as a combination of concrete and resin.

Sensors such as 32 with associated antenna 34 are positioned on the surfaces of the concrete pylon of an overpass. A mobile reader 36 can drive under the overpass and take readings from the sensors to determine the curing state of the structural materials. When the materials have reached the appropriate level of curing, as measured by a change in the capacitance of the material, the project can move forward and the sheets can be removed.

In this manner, networks of electronic sensors can be printed on flexible sheeting. Associated circuit elements can also be printed onto the sheets. A remote reader can energize the sensors and the take readings, allowing the user to adjust the treatment of the whatever substance underlies the sheet, whether it be crops or materials.

It will be appreciated that variants of the above-disclosed and other features and functions, or alternatives thereof, may be combined into many other different systems or applications. Various presently unforeseen or unanticipated alternatives, modifications, variations, or improvements therein may be subsequently made by those skilled in the art which are also intended to be encompassed by the following claims.

What is claimed is:

1. A system for remote sensing, comprising:
   a flexible sheet arranged above a substance to be monitored, having printed thereon:
      electronic sensors to sense conditions of the substance to be monitored under the flexible sheet by materials exuded from the substance;
      logic components arranged in circuits, the circuits electrically connected to the sensors;
      memory electrically connected to the circuits;
      energy harvesting components electrically connected to the circuits to receive transmitted energy to power the sensors, components and memory; and
      a communications interface; and
   a remote reader, the reader having:
      at least one energy broadcast component to broadcast energy to the energy harvesting components; and
      an interface to allow the reader to access data from the sensors.

2. The system of claim 1, wherein the flexible sheet further comprises energy storage.

3. The system of claim 1, wherein the electronic sensors comprise one of heat sensors, chemical sensors, humidity sensors, and temperature sensors.

4. The system of claim 1, wherein the logic components comprise one of sense amplifiers, analog to digital converters, logic gates, and LEDs.

5. The system of claim 1, wherein the communications interface comprises one of radio frequency, infrared, and visible light.

6. The system of claim 1, wherein the energy broadcast component comprises one of a radio frequency beam generator, an electromagnetic field generator or a magnetic field generator.

7. The system of claim 1, wherein the interface comprises a radio frequency link to broadcast sensor data as a message.

8. The system of claim 1, wherein the interface comprises a set of visible lights readable by a reader.

9. The system of claim 1, wherein the remote reader is a mobile reader.

10. The system of claim 1, wherein the remote reader is a fixed reader.

11. The system of claim 1, wherein the flexible sheet comprises plasticultural film and the substance to be monitored comprises outdoor crops.

12. The system of claim 1, wherein the flexible sheet comprises plasticultural film and the substance to be monitored comprises greenhouse crops.

13. The system of claim 1, wherein the substance to be monitored comprises a curable material.

* * * * *